United States Patent Office 2,734,921
Patented Feb. 14, 1956

2,734,921

NICKEL-CATALYSED HYDROGENATION PROCESSES

Thomas Bewley, Epsom, and Basil Vivian Aller, Hull, England, assignors to The Distillers Company Limited, Edinburgh, Scotland, a British company No Drawing. Application December 1, 1950,
Serial No. 198,748

Claims priority, application Great Britain
December 7, 1949

4 Claims. (Cl. 260—601)

This invention relates to the use of Raney nickel catalysts, in conjunction with hydrogen containing as impurity carbon monoxide in amounts ranging from about 10 parts per million up to about 5% by volume.

Whereas it has previously been supposed that commercial hydrogen of this character poisons Raney nickel at temperatures below 84° C., the present process provides a process whereby temperatures in the range 20° C.–84° C. may be employed provided that periodic or continuous reactivation is effected by maintaining the catalyst at a temperature above 85° C., i. e. (as will be manifest from the illustrative examples which follow) at temperatures of about 100° to about 180° C., preferably in a stream of hydrogen, the upper temperature limit for reactivation corresponding to that at which the catalyst tends to sinter.

The present invention finds particular application in the use of liquid-suspended Raney nickel catalysts for liquid or vapour-phase hydrogenation processes, for example, processes for the selective hydrogenation of ethylenic linkages in materials such as crotonaldehyde, in which case the above mentioned temperature range can efficiently be used.

When operating at temperatures below 85° C. the catalyst must be heated intermittently as set forth above, either during an interruption of the hydrogenation, for example, at the end of each run in a batch process, or on removal of part of the catalyst continuously or intermittently in the course of a continuous run.

The lower reactivation temperature above 85° C., according to the invention, is highly critical. Thus, a 50% w./v. solution of alphamethyl styrene in isopropyl benzene may be converted substantially completely in the presence of 1% of Raney nickel using commercial hydrogen at 100° C., and there is no loss of catalytic activity after 21 batches, each taking 5–6 hours. At 90° C. the hydrogenation is complete after 12–14 hours and the activity is little diminished after 6 batches, whereas at 85° C. 90% of the alphamethyl styrene is converted after 14 hours although the catalyst activity is maintained at this level after 8 batches. However, at 75° C. 15 hours are required to effect 75% conversion, at which point hydrogen adsorption ceases; in the second batch only 64% can be converted in 25 hours, and in the third batch only 58% can be converted in 21 hours, when adsorption ceases.

The present invention provides a process for the catalytic hydrogenation of organic compounds, which include unsaturated hydrocarbons, for example styrene and alkyl styrene, unsaturated aldehydes, for example crotonaldehyde, aldehydes and ketones, for example diacetone alcohol; this list is not to be construed as exhaustive and the process of the present invention is applicable to the hydrogenation of any organic compound which is adapted to or capable of being hydrogenated. It is to be understood that the process of the present invention is a departure from the art only in so far as the invention is defined in the claims, and the catalytic hydrogenation of the organic compounds should otherwise be carried out under such conditions, for example of pH, and using such techniques, for example as to the nature of the diluents employed, as are known to be suitable in the art.

The following examples illustrate specific embodiments of this invention. In this connection, the symbol "% w./v." refers to parts by weight per hundred parts by volume, and the symbol "% w./w." refers to parts by weight per hundred parts by weight; the parts by weight bear the same relation to parts by volume as does the gram to the millilitre.

*Example 1*

5 grams (dry weight) of acid washed Raney nickel were added to 500 ml. of a mixture of approximately equal parts by volume of isopropyl benzene and alphamethyl styrene, and hydrogen containing 200 to 300 parts per million of carbonmonoxide was bubbled slowly through the mixture in a reaction flask at 50° C. In 18 hours, approximately 90% of the alphamethyl styrene was hydrogenated to isopropyl benzene, but the activity of the catalyst had fallen almost to zero. On heating the suspension of catalyst in isopropyl benzene to 150° C. for 1 hour, its activity was substantially completely restored, and the catalyst could be used for the hydrogenation of a further batch of alphamethyl styrene under similar conditions.

*Example 2*

A reaction flask was charged with a mixture of equal volumes of crotonaldehyde and hexylene glycol (2-methyl 2:4-pentane diol) and 10% by weight of Raney nickel-isopropanol paste was added. Hydrogenation was then effected by passing through works gas (hydrogen containing about 0.03% of carbon monoxide) until the butyraldehyde stage was reached as indicated by a residual unsaturation of less than 2% and an abrupt fall in hydrogenation rate, the conversion being effected at 25 to 60° C. The temperature was then slowly raised and the butyraldehyde was distilled off in a slow stream of works gas through a short distillation column fitted to the reaction flask. The distillation was continued until the temperature reached 150° C. and this temperature was maintained for 2 hours to bring about regeneration of the catalyst. The liquid was then cooled, crotonaldehyde was then added to restore the original volume and the hydrogenation was continued as before, being completed after 5½ hours, while the temperature was progressively raised to 70° C. By proceeding in this manner, regenerating the catalyst by heating after each batch, it was found possible to hydrogenate twenty one successive batches of crotonaldehyde, after which time the catalyst was still active.

*Example 3*

Diacetone alcohol was hydrogenated with works gas (hydrogen containing 0.02–0.03% by volume of carbon monoxide) in the presence of 10% by weight of a Raney nickel catalyst which had not been acetic acid washed, at a temperature of 50° C., in a batchwise manner, giving 2-methyl-2:4-petane diol. A serious fall in the activity of the catalyst was observed during the hydrogenation of the third batch of diacetone alcohol, and when the hydrogenation of this batch was 95% complete, the temperature of the mixture was raised to 105° C. and maintained at this temperature for 3 hours. The 2-methyl-2:4-pentane diol product is separated by decantation in the usual way, and a fresh charge of diacetone alcohol added to the catalyst. This and subsequent batches were hydrogenated at 50° C. until the hydrogenation was 95% complete, the temperature of the mixture being then raised to 105° C. for 3 hours to complete the hydrogenation. It was found that the catalyst was active after the hydrogenation of 16 batches of diacetone alcohol in this way.

Example 4

Diacetone alcohol with works gas (hydrogen containing 0.02–0.03% by volume carbon monoxide) in the presence of 10% by weight of an acetic acid washed Raney nickel catalyst at a temperature of 100°–110° C. in a batchwise manner, to give 2-methyl-2:4-pentane diol. It was found that the catalyst was still active after the hydrogenation of 13 batches of diacetone alcohol.

By way of comparison, when carrying out the hydrogenation at a temperature of 50° C., the catalyst was inactive after the hydrogenation of 3 to 4 batches of diacetone alcohol.

While this invention has been described only with respect to the particular materials which are referred to above, it will be appreciated that it is the carbon monoxide-nickel reaction which is controlling, and any material which is susceptible to hydrogenation within the above-defined temperature limits may be employed. In particular, those materials boiling below 180° C. and which, according to previous practice, had to be treated with pure hydrogen for liquid phase conversion under normal pressure, may be treated with commercial hydrogen according to this invention with great advantage.

We claim:

1. A process for the catalytic hydrogenation of an organic compound selected from the group consisting of aldehydes and ketones and olefinically unsaturated hydrocarbons with hydrogen in the presence of a Raney nickel hydrogenation catalyst, the hydrogen employed containing from 0.001% to 5% by volume of carbon monoxide, wherein the hydrogenation is carried out at a temperature in the range of 20° C.–84° C. and the catalyst is intermittently reactivated during an interruption of the hydrogenation at a temperature of from 100° C.–180° C.

2. A process for the catalytic hydrogenation of diacetone alcohol with hydrogen in the presence of a Raney nickel hydrogenation catalyst, the hydrogen employed containing from 0.001% to 5% by volume of carbon monoxide wherein the hydrogenation is carried out at a temperature in the range 20° C.–84° C. and the catalyst is intermittently reactivated during an interruption of the hydrogenation at a temperature of from 100° C.–180° C.

3. A process for the catalytic hydrogenation of alpha-methyl styrene with hydrogen in the presence of a Raney nickel hydrogenation catalyst, the hydrogen employed containing from 0.001% to 5% by volume of carbon monoxide wherein the hydrogenation is carried out at a temperature in the range 20° C.–84° C. and the catalyst is intermittently reactivated during an interruption of the hydrogenation at a temperature of from 100° C.–180° C.

4. A process for the catalytic hydrogenation of crotonaldehyde with hydrogen in the presence of a Raney nickel hydrogenation catalyst, the hydrogen employed containing from 0.001% to 5% by volume of carbon monoxide wherein the hydrogenation is carried out at a temperature in the range 20° C.–84° C. and the catalyst is intermittently reactivated during an interruption of the hydrogenation at a temperature of from 100° C.–180° C.

References Cited in the file of this patent

UNITED STATES PATENTS

| | | |
|---|---|---|
| 1,724,761 | Holden | Aug. 13, 1929 |
| 2,060,267 | Toussaint | Nov. 10, 1936 |
| 2,143,364 | Taylor | Jan. 10, 1939 |
| 2,492,403 | Smith et al. | Dec. 27, 1949 |
| 2,501,708 | Bewley et al. | Mar. 28, 1950 |
| 2,504,682 | Harlan | Apr. 18, 1950 |
| 2,623,058 | Mattox | Dec. 23, 1952 |
| 2,638,488 | Cerveny | May 12, 1953 |

OTHER REFERENCES

Ellis: "Hydrogenation of Organic Substances," 3d ed., D. Van Nostrand Co., N. Y. (1930), page 45.